United States Patent [19]

Brandenburg et al.

[11] Patent Number: 5,499,041
[45] Date of Patent: *Mar. 12, 1996

[54] KEYBOARD INTEGRATED POINTING DEVICE

[75] Inventors: Eric L. Brandenburg, Lake Oswego; Patrick J. Franz, Portland; David H. Straayer, Colton, all of Oreg.

[73] Assignee: InControl Solutions, Inc., Lake Oswego, Oreg.

[*] Notice: The term of this patent shall not extend beyond the expiration date of Pat. No. 5,231,386.

[21] Appl. No.: 322,956

[22] Filed: Oct. 13, 1994

Related U.S. Application Data

[60] Continuation of Ser. No. 96,485, Jul. 22, 1993, abandoned, which is a division of Ser. No. 557,546, Jul. 24, 1990, Pat. No. 5,231,386.

[51] Int. Cl.⁶ .......................... G06F 3/14; H01C 10/10; H01H 9/26
[52] U.S. Cl. .......................... 345/174; 345/168; 200/5 R; 338/99
[58] Field of Search .................... 345/156, 157, 345/168, 172, 184; 200/5 A, 6 A, 5 R, 511, 513; 338/99, 114; 341/27, 34

[56] References Cited

U.S. PATENT DOCUMENTS

| | | | |
|---|---|---|---|
| 4,029,915 | 6/1977 | Ojima | 200/5 A |
| 4,045,650 | 8/1977 | Nestor | 200/511 |
| 4,158,117 | 6/1979 | Quilliam et al. | 341/34 |
| 4,163,204 | 7/1979 | Sado et al. | 338/114 |
| 4,246,452 | 1/1981 | Chandler | 200/5 A |
| 4,313,113 | 1/1982 | Thornburg | 340/709 |
| 4,314,227 | 2/1982 | Eventoff | 338/99 |
| 4,394,548 | 7/1983 | Dola | 200/6 A |
| 4,408,103 | 10/1983 | Smith, III | 200/6 A |
| 4,410,872 | 10/1983 | Stecher et al. | 338/114 |
| 4,439,648 | 3/1984 | Reiner et al. | 200/6 A |
| 4,493,219 | 1/1985 | Sharp et al. | |
| 4,649,784 | 3/1987 | Fulks et al. | 84/1.1 |
| 4,680,577 | 7/1987 | Straayer et al. | 340/711 |
| 4,719,455 | 1/1988 | Louis | 200/5 A |
| 4,734,034 | 3/1988 | Maness et al. | 433/68 |
| 4,745,301 | 5/1988 | Michalchik | 307/119 |
| 4,780,701 | 10/1988 | Eppinger | 338/196 |
| 4,793,193 | 12/1988 | Borgudd | |
| 4,794,366 | 12/1988 | Sakamoto | 338/114 |
| 4,816,200 | 4/1989 | Stecher et al. | 264/59 |
| 4,818,828 | 4/1989 | Curley et al. | 200/5 A |
| 4,821,013 | 4/1989 | Iida | 338/99 |
| 4,851,626 | 7/1989 | Nagashima | 200/513 |
| 4,856,993 | 8/1989 | Maness et al. | 433/68 |

(List continued on next page.)

FOREIGN PATENT DOCUMENTS 78209030  9/1990  China.

OTHER PUBLICATIONS

J. D. Rutledge, T. Selker, *Force-to-Motion Functions for Pointing*, Human–Computer Interaction–INTERACT '90, pp. 701–706, IBM T. J. Watson Research Center, Yorktown, N.W., 1990.

IBM Tech. Disclosure, "Smart Key", v. 28, No. 5, Oct. 1985, pp. 1859–1860.

*Primary Examiner*—Richard Hjerpe
*Assistant Examiner*—Steven J. Saras
*Attorney, Agent, or Firm*—Marger, Johnson, McCollom & Stolowitz

[57] ABSTRACT

A keyswitch-integrated pointing assembly in which a plurality of substantially planar force sensing elements are disposed on a planar surface adjacent a keyswitch on a keyboard. The keyswitch includes a plunger which extends downwardly from a key cap for actuating a switch at the lower end of vertical key cap travel. The key cap engages an indexing surface when fully depressed which transmits force applied to the key cap to the force sensing elements. The force sensing elements are sandwiched between a pair of opposing plates thereby biasing the elements into a substantially linear operating region when no force is applied to the key cap.

5 Claims, 13 Drawing Sheets

U.S. PATENT DOCUMENTS

| | | | |
|---|---|---|---|
| 4,874,549 | 10/1989 | Michalchik | 252/511 |
| 4,896,003 | 1/1990 | Hsieh | 200/6 A |
| 4,897,629 | 1/1990 | Lecklider | 338/114 |
| 4,920,237 | 4/1990 | Eardley et al. | 200/5 A |
| 4,933,660 | 6/1990 | Wynne, Jr. | 338/114 |
| 4,947,461 | 8/1990 | Yoshioka et al. | 200/6 A |
| 4,951,985 | 8/1990 | Pong et al. | 293/102 |
| 4,975,547 | 12/1990 | Nakayama et al. | 200/517 |
| 5,012,230 | 4/1991 | Yasuda | 345/184 |
| 5,172,114 | 12/1992 | Bedoya et al. | 341/27 |
| 5,231,386 | 6/1993 | Brandenburg et al. | 345/168 |

KEYBOARD INTEGRATED POINTING DEVICE

This is a Continuation of application Ser. No. 08/096,485 filed Jul. 22, 1993, now abandoned, which is a divisional of Ser. No. 557,546, filed Jul. 24, 1990, now U.S. Pat. No. 5,231,386.

BACKGROUND OF THE INVENTION

1. Field of the Invention

The present invention relates generally to apparatus for controlling cursor movement on a cathode ray tube (CRT) and more particularly to such apparatus which is integrated with a keyswitch on a keyboard.

2. Description of the Related Art

Prior art pointing devices for controlling a cursor on a CRT are known. What others have failed to appreciate is the ergonomic implications of mechanical and electrical null regions which must be traversed at the outset of a pointing operation. Using prior art devices, even those that are force-sensitive, a user gets no response to lateral displacement initially, until an electrode makes initial contact, for example, with an elastomeric resistive layer. The initial contact causes a step response, as resistance drops from infinity to a measurable value—a jump the user may not have anticipated or desired. Then, as force is increased, resistance falls rapidly, over some range, and finally falls more slowly with the application of additional force. All of this is disconcerting to a user for most applications. What is needed is to provide for pointing which is smoothly and consistently responsive to user input from the outset of the pointing operation.

Another disadvantage associated with prior art devices is that they are not sensitive to z-axis force. Forces applied laterally, i.e., in the x-y axis plane move the CRT cursor correspondingly. It would be desirable for a vertical force, e.g., down the shaft of a joystick-type controller, to produce a proportional signal. Such a signal could be used for example to control line width while drawing as a function of z-axis force on the pointing device.

Pointing devices which are integrated into keyswitches on keyboards are also known in the prior art. In addition to suffering from the above-described disadvantages associated with prior art pointing devices, such integrated devices take up substantially more space than a conventional key switch.

One prior art cursor control is shown in U.S. Pat. No. 4,313,113 (Thornburg). It employs four orthogonal variable resistance pressure transducers, each transducer comprising a coordinate electrode spaced from a cooperating electrode, at least one of the electrodes being an elastomeric sheet material formed of a carbon loaded polyolefin. The path resistance through the transducer goes down as applied pressure goes up. Thornburg recognizes the advantage of using force to control cursor speed. It makes no suggestion to integrate the device into a regular keyswitch. The electrodes are spaced from the elastomeric layer, at rest, so that there is a mechanical and electrical null region before the system responds to a force input, followed by a step response when the electrode layers make initial contact.

U.S. Pat. No. 4,439,648 (Reiner et al.) is directed to a basic stand-alone joystick. The handle rests on a rigid pivot so that vertical force is ignored. The handle is coupled to an actuator portion spaced from all four switches, so there is a neutral or null region of displacement before any switch is closed. The switches are conventional, yielding only a binary signal, without regard to force.

U.S. Pat. No. 4,408,103 (Smith, III) discloses a miniaturized joystick adapted for mounting in a wristwatch. The joystick handle rests in a hollowed-out bearing surface so that none of the switches is actuated by a downward force on the handle. The switch actuating means is maintained spaced from all the switches by a resilient rubber sheet layer, so there is a neutral or null region of displacement before any of the switches is closed. The switches are miniaturized by forming them as interleaved electrodes on a PCB. When the handle is pivoted, an actuator pushes a conductive region of the resilient layer into contact with a corresponding switch. The switches each yield a binary output, so lateral force beyond an initial detent is ignored.

U.S. Pat. No. 4,246,452 (Chandler) shows another joystick type device, here having 16 possible output signals. The mechanism again employs a handle having a depending member that rests in a hollowed out bearing surface. Once again, the switches each provide a binary signal, independent of lateral force beyond a threshold force; vertical force is ignored; and, the actuator is spaced from the switches to provide a null region.

U.S. Pat. No. 4,680,577 (Straayer et al.) suggests a multipurpose cursor control keyswitch that serves both as a regular typing key, preferably in the "home row" (asdf-jkl;) of a keyboard, as well as a force-sensitive pointing input device. The use of strain gauges as shown therein for force sensing, however, is not commercially practical. Additionally, the recent rise in popularity of portable, lap-top and now "notebook" computers makes low profile methods essential.

SUMMARY OF THE INVENTION

The present invention comprises a pointing device having a reference plate and a generally planar force sensing means mounted on the reference plate. An actuator applies force to said force sensing means. The actuator and force sensing means are interconnected so that lateral and vertical forces applied to said actuator are transmitted to said force sensing means.

In another aspect of the present invention, the pointing device is integrated with a keyswitch on a keyboard.

It is a general object of the present invention to provide a keyswitch-integrated pointing assembly which overcomes the above-enumerated disadvantages associated with prior art devices.

It is another object of the present invention to provide such an assembly which smoothly distributes forces between sensing elements.

It is still another object of the present invention to provide such an assembly which moves the operating point of the force sensing elements into a continuous, smoother, region of operation.

It is yet another object of the present invention to provide such an assembly having generally opposed sensors which are loaded and unloaded in a complementary fashion.

It is another object of the present invention to provide such an assembly which is relatively low profile in structure and which is manufactured with relatively low dimensional tolerance sensitivity.

The foregoing and other objects, features and advantages of the invention will become more readily apparent from the following detailed description of preferred embodiments which proceeds with reference to the drawings.

DETAILED DESCRIPTION OF THE PREFERRED EMBODIMENTS

Figure 1:
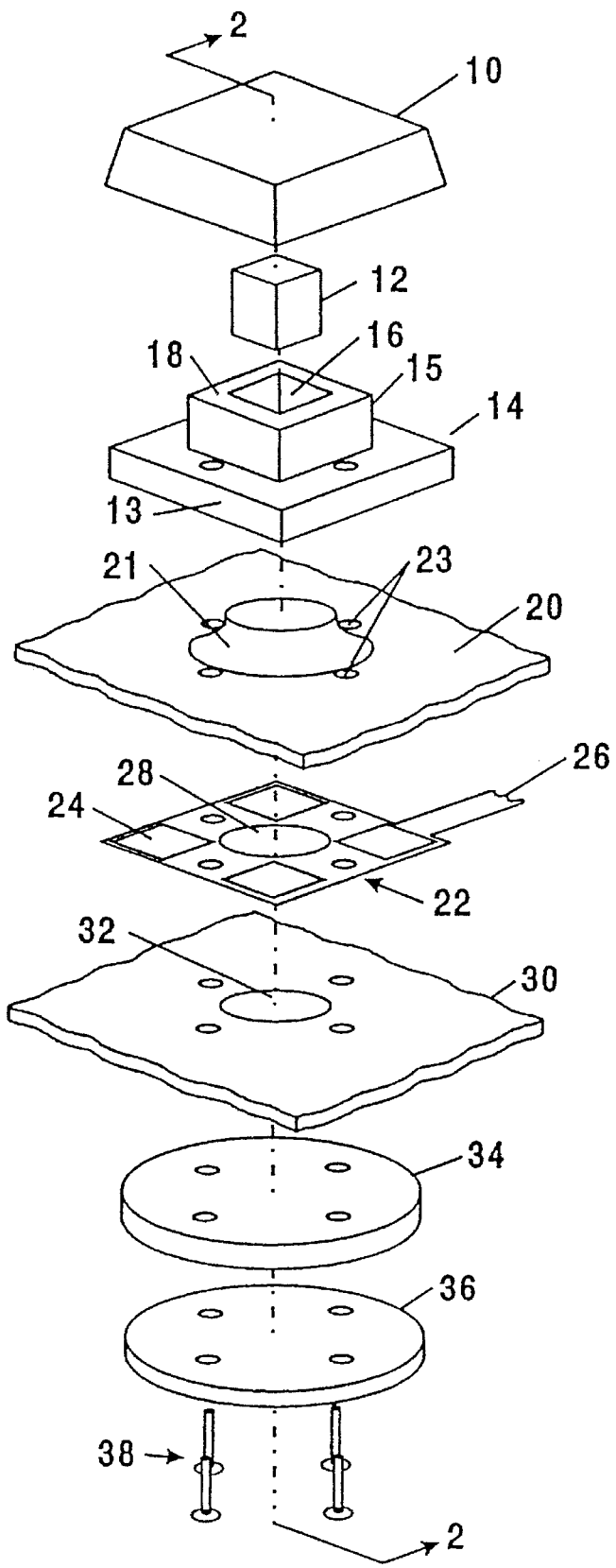
FIG. 1 is an exploded perspective view of a first embodiment of a elastomeric dome keyswitch and integrated pointing assembly according to the present invention.

FIG. 1 is an exploded perspective view of a first embodiment of an elastomeric keyswitch and integrated pointing assembly according to the present invention. Beginning roughly in the middle of the diagram, a conventional elastomeric type keyboard includes a base plate 30, such being also referred to herein as a reference plate, which is generally planar. The base plate may be of any suitable rigid material, such as a plastic or metal, or it may be a printed circuit board. For many applications, the base plate 30 is a printed circuit board and it includes a plurality of switch contacts 32, like contacts 32, formed on the printed circuit board so that switch closure is effected by downward pressure on the switch contacts. This type of keyswitch is commonly used in a computer keyboard, in which an array of such switch contacts are formed on the base plate in a predetermined pattern corresponding to the pattern of the typing keys.

A conventional elastomeric keyboard also includes a rubber dome sheet 20. The rubber dome sheet includes an array of dome springs, like dome spring 21, which provide a spring action that biases the keyswitch to the standby open position. The rubber dome sheet 20 is registered over the base plate 30 so that each dome spring 21 is aligned over a respective one of the switch contacts 32. In some designs, the switch contacts 32 on the base plate comprise an interleaved set of conductive fingers. In that case, the underside of the dome spring 21 includes a conductive pad which, when pressed against the interleaved fingers, completes an electrical path between the fingers thereby closing the switch.

Alternatively, in a membrane type keyswitch, the switch may comprise a vertically spaced pair of electrodes in which case the underside of dome spring 21 need not be conductive, but merely arranged to impart vertical force to close the switch. A plunger guide 14 rests on top of the rubber dome sheet 20. The rubber dome sheet is silicone with a 30–50 Shore "A" durometer. The plunger guide 14 includes a central aperture 16, further discussed below. The plunger guide 14 is positioned with the aperture 16 aligned over the dome spring 21 and switch contacts 32. In the present embodiment of the invention, plunger guide 14 is polycarbonate. The plunger guide 14 also includes a tower portion 15 extending about the periphery of aperture 16. The tower portion 15 includes an upper surface 18, hereafter referred to as the actuator indexing surface.

A conventional key cap 10 is coupled to a plunger 12. In some cases, the key cap and plunger are molded of a single part, and in other cases they may be formed of separate parts and engage one another. The aperture 16 is sized to fittingly engage the plunger 12 while allowing vertical sliding motion of the plunger responsive to a vertical force applied to the key cap by an operator.

A force-sensing resistor array 22 is positioned between the base plate 30 and rubber dome sheet 20. The force-sensing resistor array 22 includes a central aperture 28, sized to clear the plunger 12 and switch contacts 32. The array 22 is positioned so that the aperture 28 is registered with the plunger guide aperture 16, dome spring 21 and switch contacts 32. In a typing mode of using the apparatus, a generally downward pressure is applied to the key cap 10 by an operator. The key cap and plunger 12 move downward together, with the plunger sliding through the plunger guide aperture 16. The bottom end of the plunger contacts dome spring 21 and compresses the dome sheet so that the underside of the dome spring 21 contacts the switch contacts 32 on the base plate. Accordingly, the force-sensing resistor array 22 does not interfere with, or in any way affect, the usual operation of the keyswitch.

Vertical travel of the key cap and plunger is limited to a position in which the key cap indexing surface 11 contacts the actuator indexing surface 18. The key cap indexing surface 11 and actuator indexing surface 18 have complementary configurations for mating with one another. They may simply be flat, for example, or they may be tapered, stepped, or the like, to aid in guiding the plunger and to contribute to a solid coupling between the key cap and plunger, on the one hand, and the plunger guide/actuator 14 on the other hand, when the key cap is in a depressed state.

Figure 2:
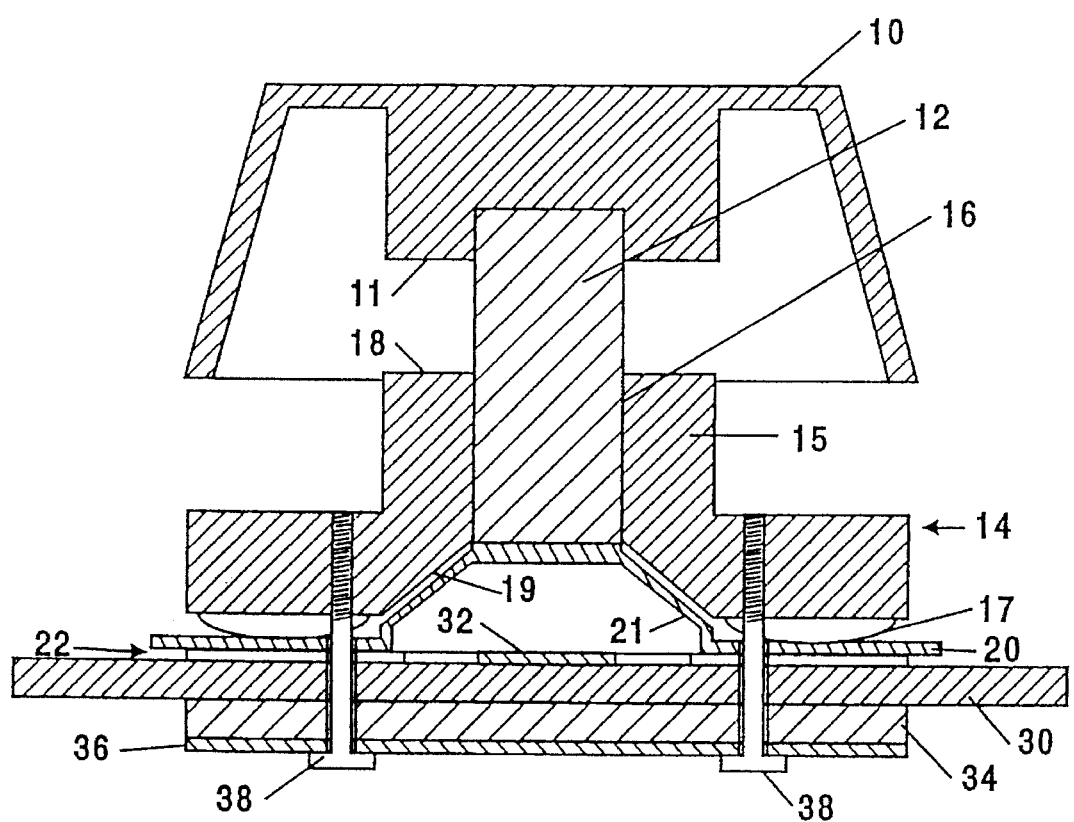
FIG. 2 is a cross-sectional view taken along line 2—2 in FIG. 1.

A pre-load pad 34 is positioned in parallel contact with the underside of base plate 30. A rigid back-up plate 36 is positioned in parallel contact with the underside of pre-load pad 34. The back-up plate 36, pre-load pad 34, base plate 30, force-sensing resistor array 22, and rubber dome sheet 20, all have a plurality of mounting holes, preferably arranged symmetrically about the neutral axis. The neutral axis, as used herein, refers to a vertical axis through the center of apertures 16, 28, dome spring 21, etc. in FIGS. 1 and 2 and to a corresponding central axis in each of the other embodiments. The plunger guide/actuator 14 includes corresponding mounting holes, at least extending into the underside of the plunger guides/actuator, for receiving fastening means such as fasteners or screws 38. The screws 38 extend through the back-up plate, pre-load pad, base plate, force-sensing resistor array, rubber dome and rubber dome sheet and are threadably secured in the plunger guide/actuator for maintaining the foregoing elements in the positions described. As can be seen in FIG. 2, the bores in plates 30, 36; pad 34; array 22; and sheet 20 through which screws 38 extend are sized to leave an annular space as shown between the shaft of each screw 38 and the bores through which it is received. With the end of each screw threadably secured in guide/actuator 14, the guide/actuator may thus be rocked or tilted about the neutral axis in a manner and for a purpose which is described in more detail hereinafter. The fasteners 38 could be integrally formed with the back-up plate 36 or guide/actuator 14.

Operation of the elastomer key switch and integrated pointing assembly of FIG. 1 is best understood with reference to a cross-sectional view of the same assembly shown in FIG. 2. FIG. 2 shows the assembly of FIG. 1 in the standby state, i.e., when no external force is applied to the key cap 10. This cross-sectional view illustrates a flat configuration of the indexing surfaces 11, 18.

The actuator 14 includes four actuator surfaces 17, protruding from the underside of actuator 14 and positioned so that each of the actuator surfaces 17 contacts a respective one of the force-sensing resistor elements 24 in the array 22. Preferably each of actuator surfaces 17 are substantially in the shape of a spherical segment. The rubber dome sheet 20 extends between the actuator surfaces 17 and the corresponding force-sensing elements 24. This has been found to be advantageous in that the rubber dome sheet smoothly disperses or distributes forces applied through the actuator surfaces 17 to the force-sensing element 24. The base plate 30 provides a relatively rigid support to the underside of the force-sensing array 22 so that forces applied through the actuator surfaces 17 are efficiently coupled to the force-sensing array. The actuator 14 includes a hollowed out portion on the underside, defined by a surface 19, so that the actuator 14 does not contact the dome spring 21. The actuator therefore does not interfere with the usual typing operation.

The height of the tower portion 15 of the actuator is sized to cooperate with the key cap and plunger to limit vertical displacement of the keycap and plunger to a position sufficient to actuate switch contacts 32, but no further. Once the indexing surfaces 11, 18 are contacting one another, substantially all forces applied to the key cap by an operator, vertical as well as lateral, are transmitted through the plunger and actuator to the force sensor array.

As noted with regard to FIG. 1, the actuator 14 is coupled to the back-up plate 36 by suitable rigid fasteners 38. The pre-load pad 34, extending between the back-up plate 36 and the base plate 30 is formed of a compressible material such as a closed cell foam. In the present embodiment of the invention, plate 30 comprises a polyurethane foam with a low compression set. During manufacture, the fastening means are applied so as to partially compress the pre-load pad 34. This arrangement holds the entire assembly together without play and, more particularly, applies a pre-load force to each of the force-sensing elements 24.

Applying a pre-load force to the force-sensing resistor elements 24 is important for the following reasons. First, force-sensing resistor elements, for example a device sold under the trade name FSR * by Interlink, Inc. of California, provide essentially infinite resistance when no force is applied to the element. When even small initial force is applied, on the order of a hundred grams, the FSR * elements instantly drop to an initial resistance on the order of a few hundred thousand ohms. This drastic change, or step response, is disconcerting to an operator and undesirable for most applications. The application of a pre-load force to the FSR * device eliminates this initial step response problem.

Second, even after a small initial force is applied, FSR * elements exhibit resistance to force characteristics that initially changes very quickly, for example, exponentially, and, as force is further increased, moves into a more linear region of operation. By arranging a pre-load force to bias the FSR * elements into this more linear region of operation, the devices will exhibit a more linear response to external forces applied by the operator.

It may be observed that the key cap 10 is entirely supported by the structures shown in FIG. 2. In a conventional keyboard, the key cap and plunger are supported by a plunger guide having a central aperture similar to aperture 16 in actuator 14, but the guide generally is part of a continuous molded plate that includes a guide for each of the key switches in a keyboard array. Here, the plunger guide is formed in the actuator 14, which must be isolated from the rest of the keyswitch array to provide for imparting lateral forces for pointing operations. The structure shown in FIG. 2, therefore, is freestanding, except that it is mounted on the base plate or printed circuit board 30.

In normal keyswitch operation, as noted, the pointing device apparatus does not affect the switch operation. The tactile response or "feel" of the keyswitch is the same as an unmodified keyswitch, in that it is determined by the usual dome spring 21 on the rubber dome sheet 20. In a pointing operation, the indexing surfaces 11, 18 contact each other so that all forces imparted to the key cap 10 by an operator are transmitted to the actuator 14 and, through the actuator surfaces 17, to the force-sensing array 22. As noted above the force-sensing elements are pre-loaded to a predetermined operating point, so that a lateral force applied to the key cap 10, for example, along the X or Y axis, results in a differential signal in that the force applied to one of the force-sensing elements 24 is increased while the force applied to the force-sensing element opposite the first force-sensing element is decreased. A force applied in any direction off the X or Y axis results in resistance to change in all four sensing elements.

Noteworthy is the absence of any pivot type supporting means as in a conventional joystick. According to the present invention, the keycap and plunger are supported, in the depressed state, by the actuator 14. Accordingly, downward or Z direction forces are coupled through the actuator surfaces 17 to the sensing array 22. The present apparatus thereby measures the overall or net force applied by an operator. The net force can easily be computed by summing the forces on all the sensors. The net applied force information is useful in many applications, for example, to control cursor speed, or to provide Z axis control. Increasing the apparent cursor speed in response to a greater operator applied force provides a natural and ergonomically efficient response.

The pre-load pad 34 also affords the advantage of neutralizing manufacturing variations in the various components described, as well as obviating a pivot's high tolerance requirements. In use, the compressed pre-load pad 34 takes up variations in thickness of the elements in between the backup plate 36 and the actuator 14 to avoid any play or wobble in the system. As long as the force-sensing elements are biased to some reasonable operating point, a processing unit coupled to the force-sensing array can be arranged to calibrate itself to define zero force as whatever resistances are provided by the force-sensing elements in the absence of externally applied forces.

Elimination of the pivot type supporting means also allows the present invention to avoid interference with the operation of the existing keyswitch means.

Figure 3:
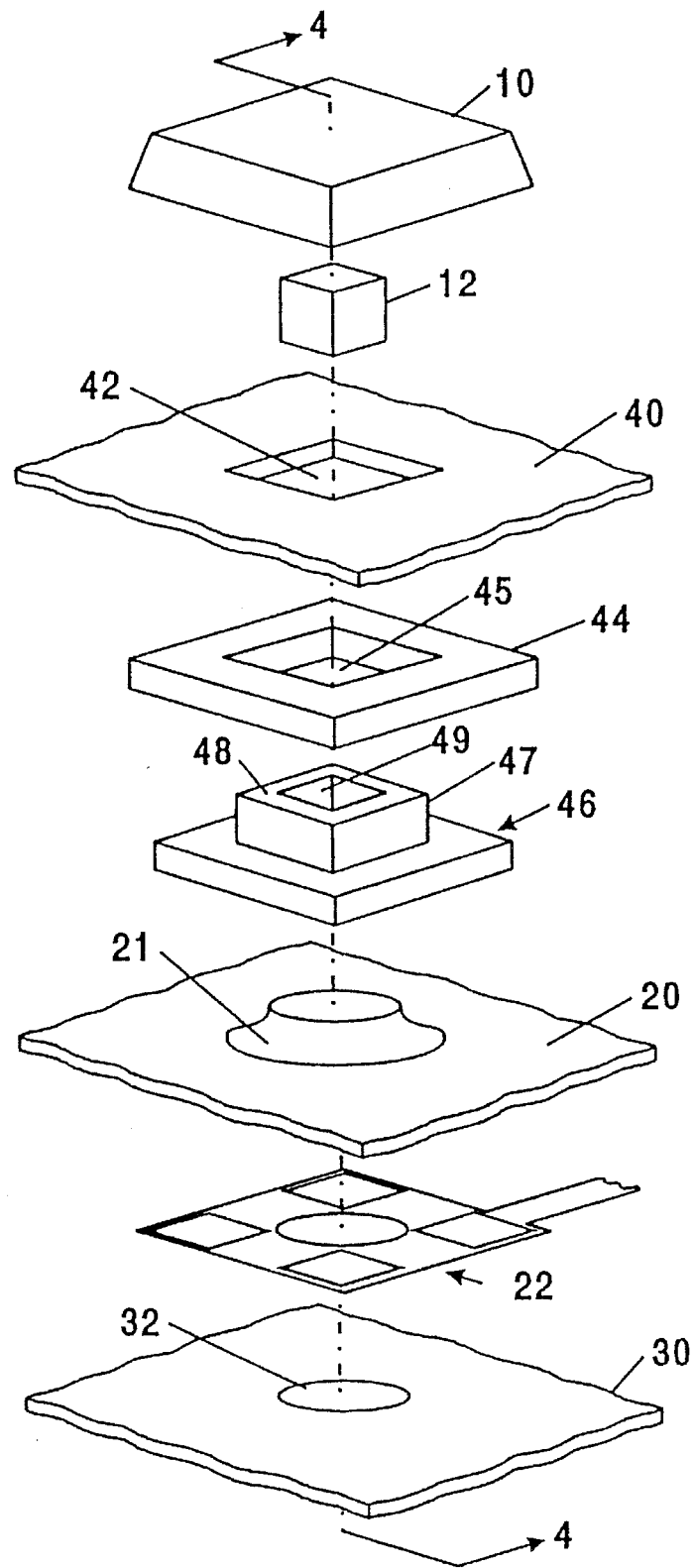
FIG. 3 is an exploded perspective view of an alternative embodiment of a elastomeric dome keyswitch and integrated pointing assembly according to the present invention.

FIG. 3 is an exploded perspective view of an alternative embodiment of an elastomer keyswitch and integrated pointing assembly according to the present invention. Referring to FIG. 3, the assembly again includes a base plate 30, a force-sensing array 22, rubber dome sheet 20, keycap 10, and plunger 12, all of which are similar to those described with regard to FIGS. 1 and 2. Here, the existing keyboard or other device is assumed to include a fixed top plate 40. The top plate 40 may be part of a larger plate that forms part of a keyboard array or, for example, may be part of a rigid enclosure. Plate 40 includes a central aperture 42 which is sized to provide clearance around the guide tower 47 to allow lateral displacement of the tower. For some applications, in which the existing aperture 42 is sized to fittingly engage the plunger for guiding the plunger, it must be suitably enlarged for implementing the integrated pointing assembly. A combined plunger guide and actuator 46 (hereafter "actuator") is positioned, as before, to rest on the existing rubber dome sheet 20, albeit without contacting the dome spring portion 21. Actuator 46 includes a central aperture 49 sized to fittingly engage the plunger 12 while allowing sliding motion of the plunger responsive to the vertical depression of the keycap. The actuator 46 also includes a tower portion 47 extending about a periphery of the aperture 49 and including an actuator indexing surface 48 for contacting a complementary keycap indexing surface 11 (shown in FIG. 4) on the underside of the keycap.

A preload means 44, in this case a foam pre-load pad, includes a central aperture 45 sized to clear the tower 47 so that the pre-load pad 44 rests on the peripheral flange portion of actuator 46.

Figure 4:
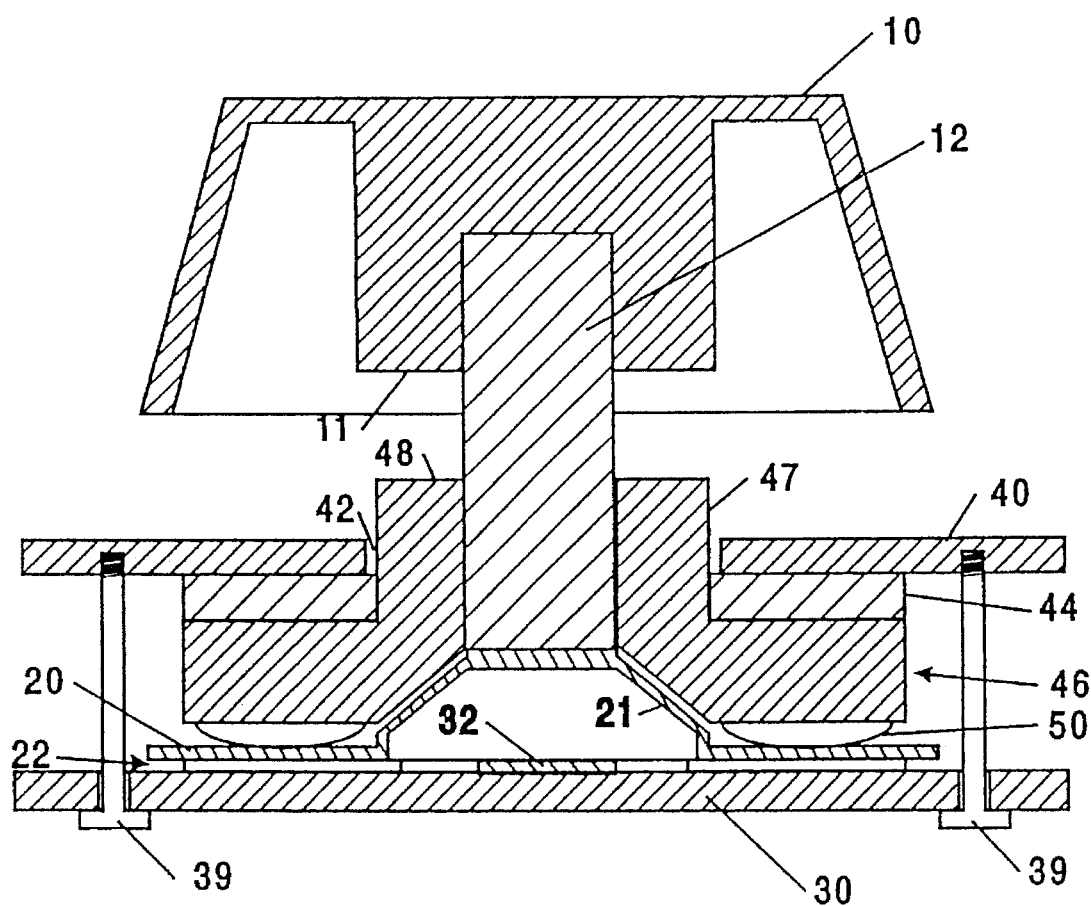
FIG. 4 is a cross-sectional view taken along line 4—4 in FIG. 3.

FIG. 4 is a cross-sectional view of the assembly of FIG. 3 in a standby position, i.e., in the absence of externally applied forces. Actuator 46 includes a hollowed out portion on the underside so that it does not contact the dome spring 21. The actuator 46 includes actuator surfaces 50 protruding from the underside of the actuator, each of which is positioned over a respective one of the force sensor elements 24.

As before, the rubber dome sheet 20 extends between the actuator surfaces 50 and the corresponding force sensor elements for distributing applied forces. As noted, the aperture 42 in support plate 40 provides a space 42 between the actuator 46 and support plate 40 extending around the entire periphery of the aperture 42, so that, even when a lateral force is applied to deflect the keycap and plunger off the neutral axis, the actuator does not contact the support plate 40. The pre-load pad 44 is positioned between the peripheral flange portion of the actuator 46 and the underside of support plate 40.

In the typical keyboard application, the support plate 40 is fixed to the base plate 30, independently of the structures here described. For example, a typical keyboard may have screws or other fasteners interconnecting top and bottom plates at several locations. Such an arrangement may be adequate to hold the structures of FIGS. 3 and 4 in their intended positions. However, it may be preferable, depending upon the particular application, to provide fastening means for interconnecting the support plate 40 to the base plate 30 in one or more locations adjacent the integrated assembly of FIGS. 3 and 4 to ensure appropriate pre-loading of the force-sensing elements as described above. This is illustrated in FIG. 3 as fastener 41. Although the pre-loading pad is arranged differently in the embodiment of FIGS. 3 and 4, it functions essentially in the same manner and provides the same advantages as described above with respect to FIGS. 1 and 2.

Figure 5:
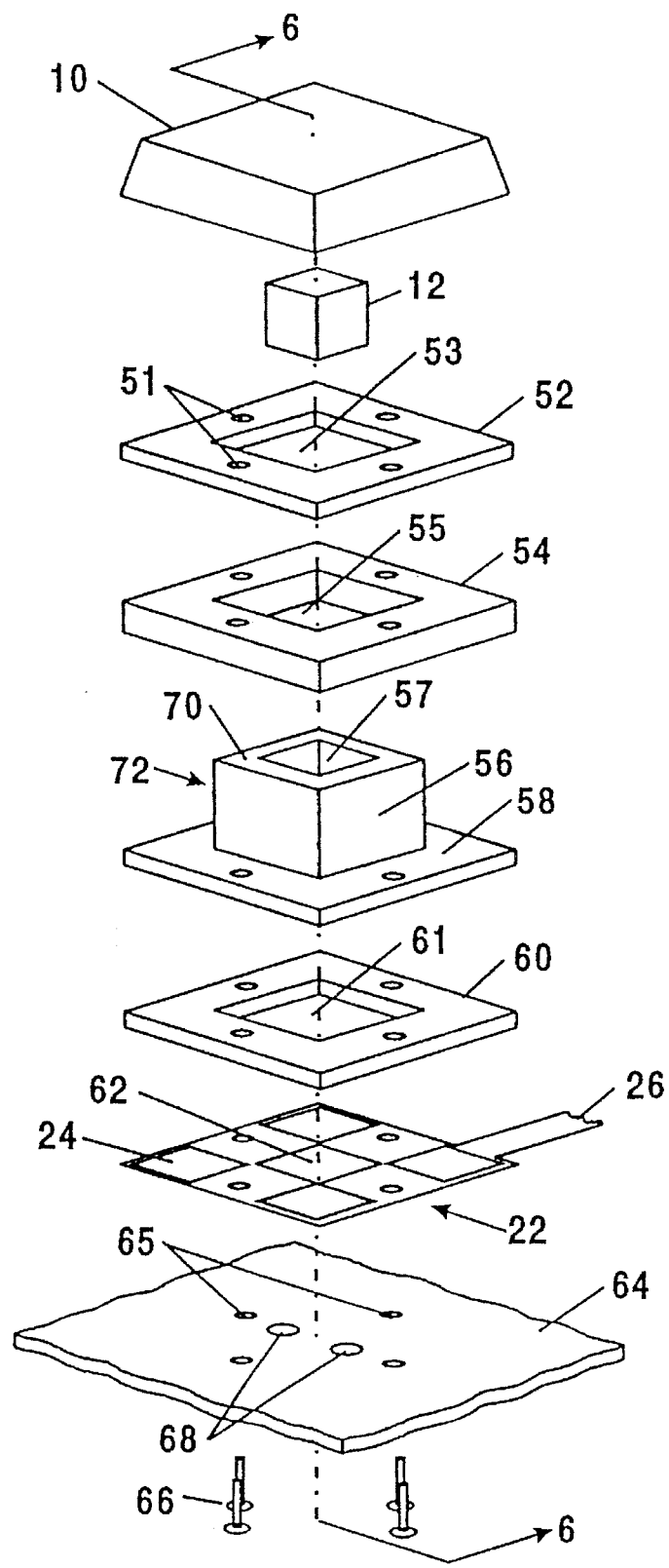
FIG. 5 is an exploded perspective view of a first embodiment of a discrete keyswitch and integrated pointing assembly according to the present invention.

FIG. 5 is an exploded perspective view of a first embodiment of a discrete keyswitch and integrated pointing assembly according to the present invention. The term "discrete keyswitch" is used here to refer to any of a variety of switches which are self-contained to stand alone. That is, the discrete switch includes some switch mechanism disposed within a housing and having a plurality of leads extending from the housing for electrical connection to the switch. This is distinguished from an elastomer keyswitch of the type described above which is implemented in some elastomer or arranged on a printed circuit board. FIG. 5 thus includes a switch mechanism housing 56 that encloses a conventional switch.

An existing base plate (or printed circuit board) 64 includes mounting holes 65 and a plurality of clearance holes 68, sized to clear leads (in FIG. 6) that extend from the underside of the switch housing 56.

Force-sensing array 22, keycap 10 and plunger 12 are similar to those described above. The switch mechanism housing 56 which, in general, is a cube-shape, is modified to include an actuator flange 58 extending about a periphery of the housing as shown. The combined unit is referred to hereafter as a switch/actuator 72. Switch/actuator 72 includes a central aperture 57 sized to fittingly engage the plunger 12 while allowing a vertical sliding motion therein.

Figure 6:
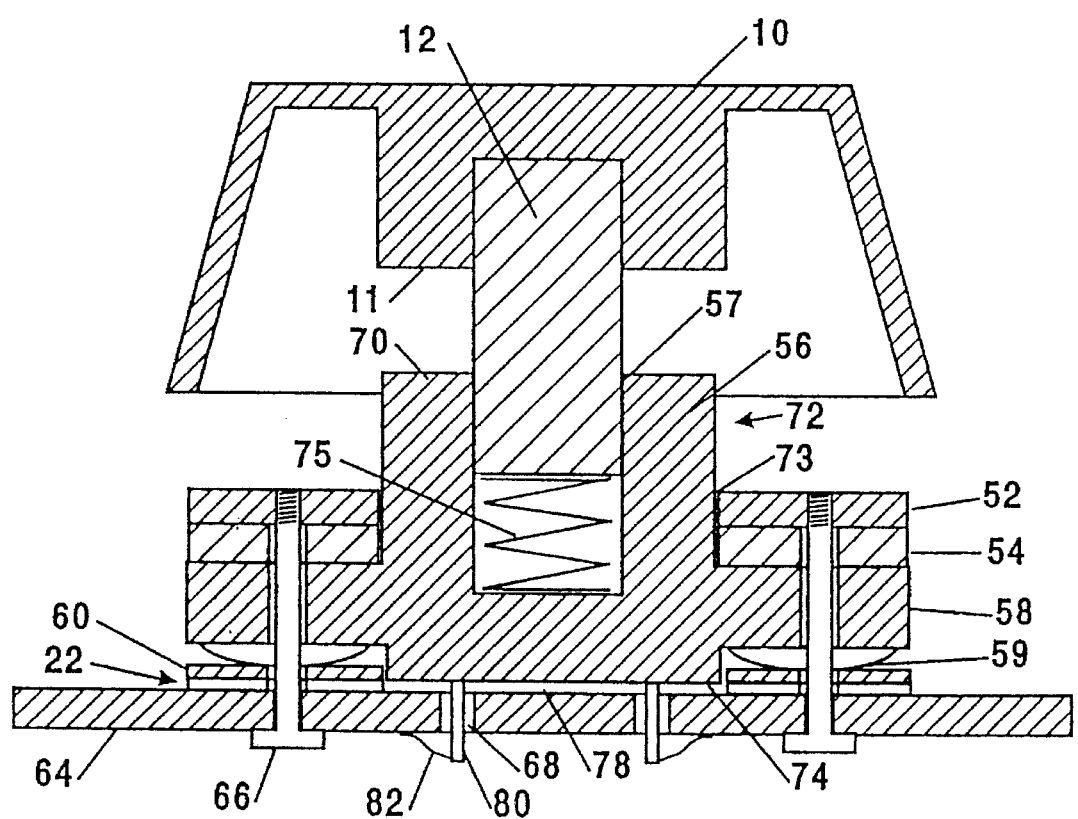
FIG. 6 is a cross-sectional view taken along line 6—6 in FIG. 5.

The switch/actuator 72 also includes a switch/actuator indexing surface 70 extending along a periphery of aperture 57 for contacting the keycap indexing surface 11 as described above. A compliant force distribution pad 60 is sized and shaped to fit between the sensor array 22 and switch/actuator 72, and, more particularly, to cover the force sensing elements 24. Pad 60 is made from a material similar to rubber dome sheet 20. The force distribution pad 60 includes a central aperture 61 sized and arranged to clear a bottom portion of the switch/actuator 72, as best seen in FIG. 6. The force distribution pad is formed of a resilient, compliant material such as a foam or rubber material, for distributing forces applied by the switch/actuator 72 over a surface area of the force-sensing elements 24, similar to the rubber dome sheet 20 in the embodiments described above.

A pre-load pad 54 is arranged to rest on an upper surface of the actuator flange 58 and includes a central aperture 55 sized to clear the switch mechanism housing 56. Finally, a pressure plate 52 is sized to at least cover the pre-load pad 54 and similarly includes a central aperture 53 sized to clear the switch mechanism housing 56. A plurality of fasteners 66, for example screws, are disposed to extend through or from the base plate 64, through elements 22, 60, 58 and 54, and are secured into holes 51 provided in the pressure plate 52 for that purpose. The arrangement of the mounting holes is not critical, although preferably they are symmetrically arranged about the neutral axis to pre-load the force-sensing elements evenly. Where the force-sensor elements 24 are arranged in a square configuration, as shown in FIG. 5, it is convenient to provide the mounting holes in a square configuration rotationally offset by 45# from the square defined by the force-sensor elements, as illustrated.

Referring to FIG. 6, the assembly of FIG. 5 is shown in cross-section in the standby state. As the switch/actuator 72 includes four actuator surfaces 59, each of which protrudes from the underside of the actuator flange region 58 and is registered with a respective one of the force-sensing elements 24. Spring 75 is a schematic depiction of a conventional biasing element which biases plunger 12 upwardly. The compliant force pad 60 extends between the actuator surfaces 59 and the force-sensing elements 24 to distribute forces transmitted by the actuator surfaces. The pre-load pad 54 and pressure plate 52, as noted, include central apertures sized to clear the switch mechanism housing 56, thereby providing a clearance gap 73 therebetween, to allow lateral deflection of the keycap and plunger, when plunger 12 is fully depressed relative to actuator 72, without contacting the pressure plate or pre-load pad. The base plate 64 is fastened to the pressure plate 52 to compress the pre-load pad 54, thereby applying a pre-load force to the force-sensing elements as discussed earlier.

Importantly, the switch/actuator 72 is arranged so that a bottom surface 74 of the switch housing 56 is spaced from the base plate 64, thereby forming a gap 78 therebetween.

The switch leads 80 extend through clearance holes 68 in the base plate and are electrically connected, for example, to the underside of base plate 64 (in the case in which the base plate is a printed circuit board) by flexible leads 82 so that there is essentially no mechanical coupling between the switch leads 80 and the base plate. Accordingly, the switch/actuator 72 rests on, and is mechanically supported only by, the actuator surfaces 59. Thus, when the keycap 10 is depressed toward the base plate so that the keycap indexing surface 11 contacts the actuator indexing surface 70, all forces applied to the keycap 10 by an operator, including downward or Z axis forces, are transmitted through elements 72, 59, and 60 to the force-sensor array 22. The clearance gap 78 is sized to allow adequate lateral deflections of the keycap and plunger while maintaining the bottom surface 74 spaced from the base plate 64. The configuration shown and described has no impact on the overall height of the keyswitch assembly, with the exception of the small gap 78. This is particularly advantageous in applications where the height profile is critical, such as keyboards in lap-top or "notebook" size computers.

Figure 7:
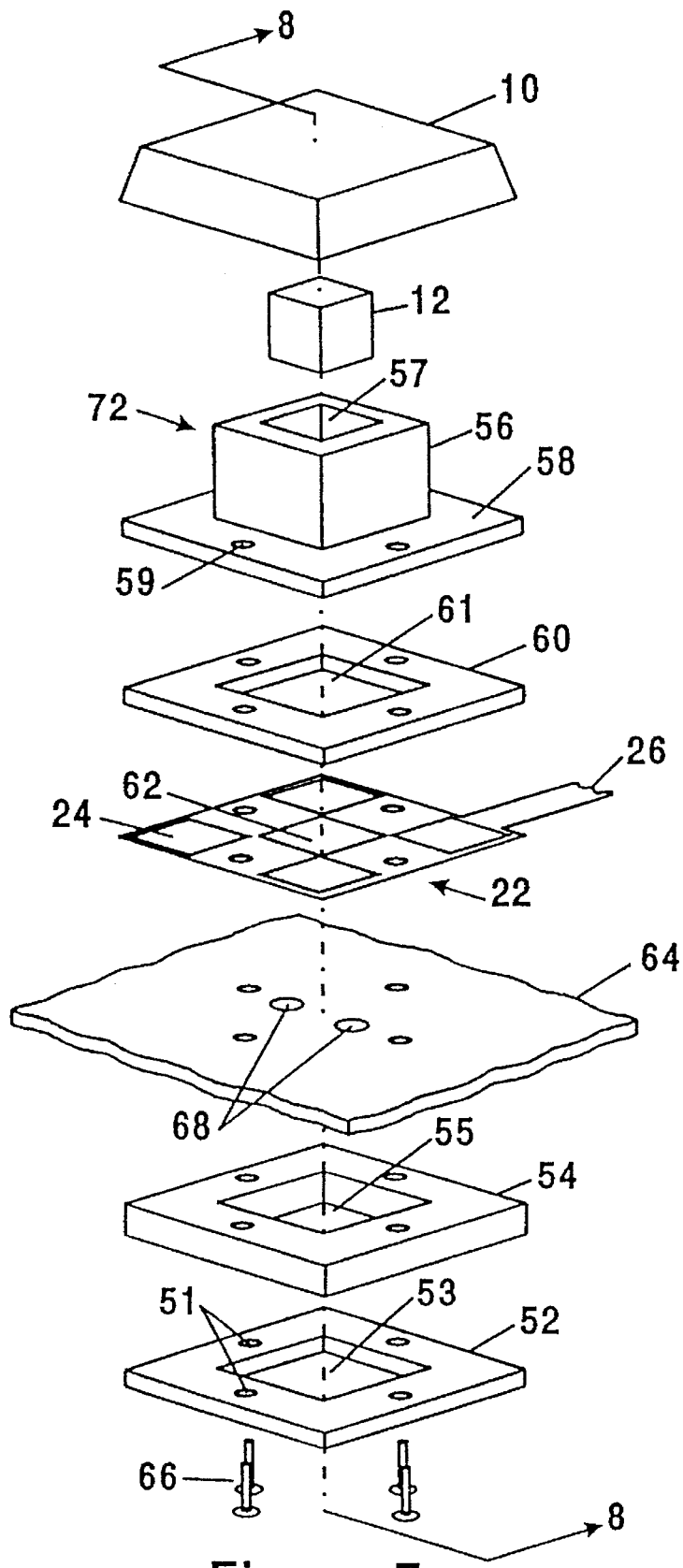
FIG. 7 is an exploded perspective view of an alternative embodiment of a discrete keyswitch and integrated pointing assembly according to the present invention.

FIG. 7 is an exploded perspective view of an alternative embodiment of a discrete keyswitch and integrated pointing assembly according to the present invention.

Figure 8:
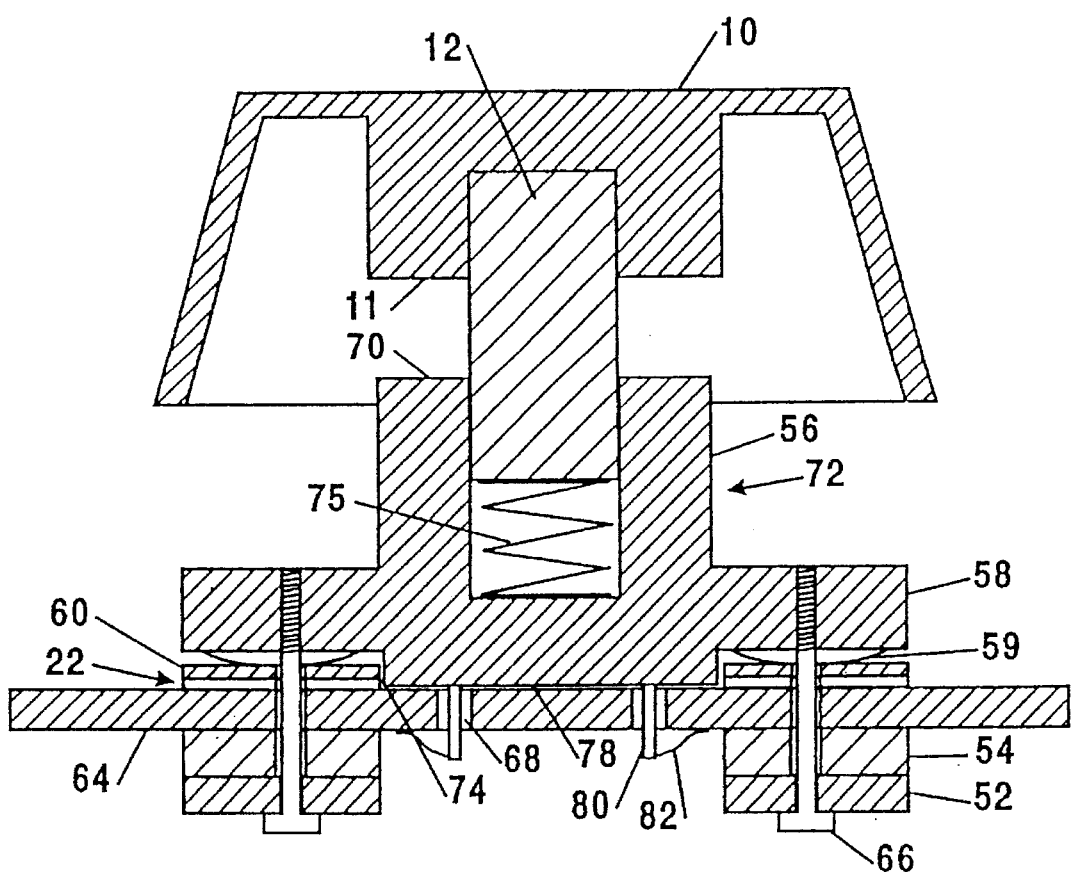
FIG. 8 is a cross-sectional view taken along line 8—8 in FIG. 7.

FIG. 8 is a cross-sectional view of the assembly of FIG. 7, shown in the standby state. The reader is by now familiar with the elements shown in FIGS. 7 and 8. Accordingly, this embodiment will be described only by way of comparison to the embodiment of FIGS. 5 and 6. In the embodiment of FIGS. 7 and 8, the pre-load pad 54 and pressure plate 52 are positioned below the base plate 64, i.e., on a side of the base plate opposite the switch/actuator 72. The assembly is otherwise similar to the earlier embodiment and functions essentially in the same way. While this embodiment extends slightly below the base plate 64, it has the advantage of providing clearance above the actuator flange 58. This allows the keycap 10 to extend down into the region over the actuator flange 58 as required in some very low-profile switch configurations.

Figure 9:
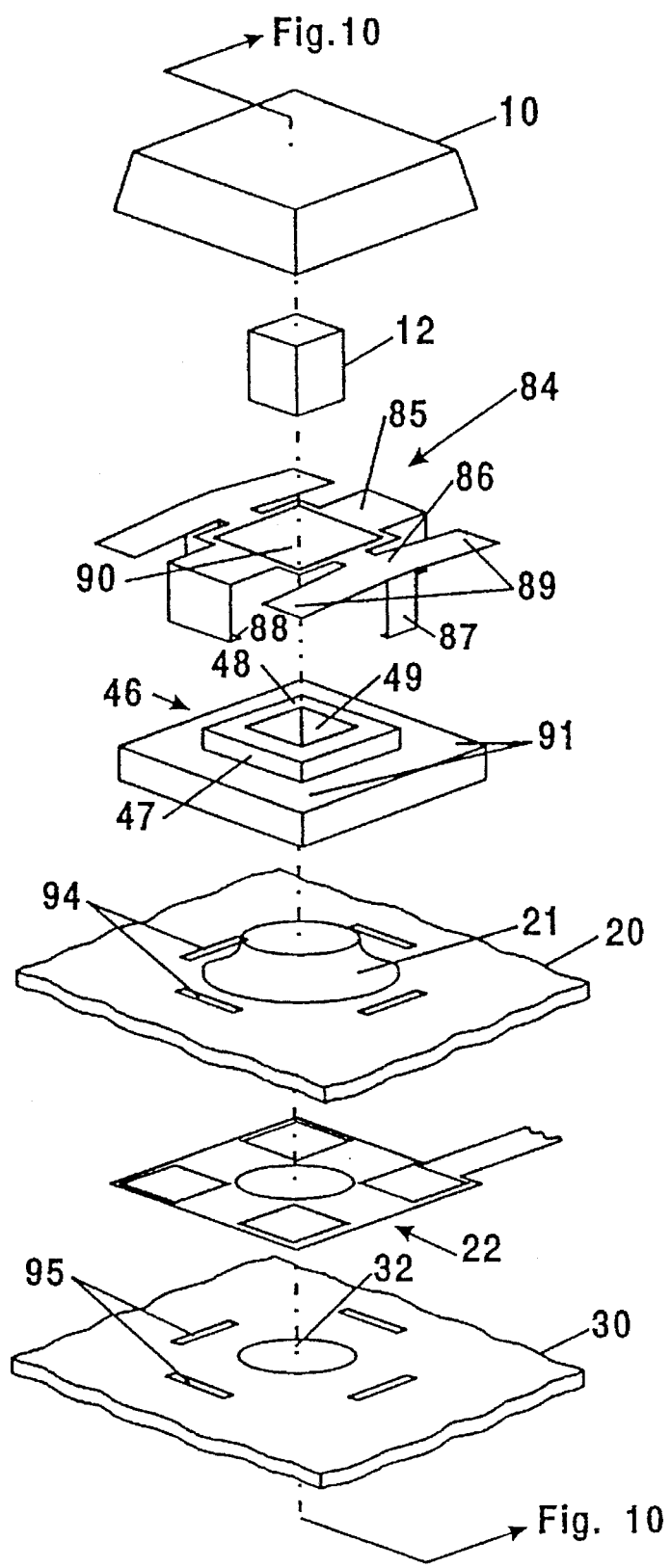
FIG. 9 is an exploded perspective view of an elastomeric dome keyswitch and integrated pointing assembly including a pre-load spring assembly according to the present invention.
Figure 10:
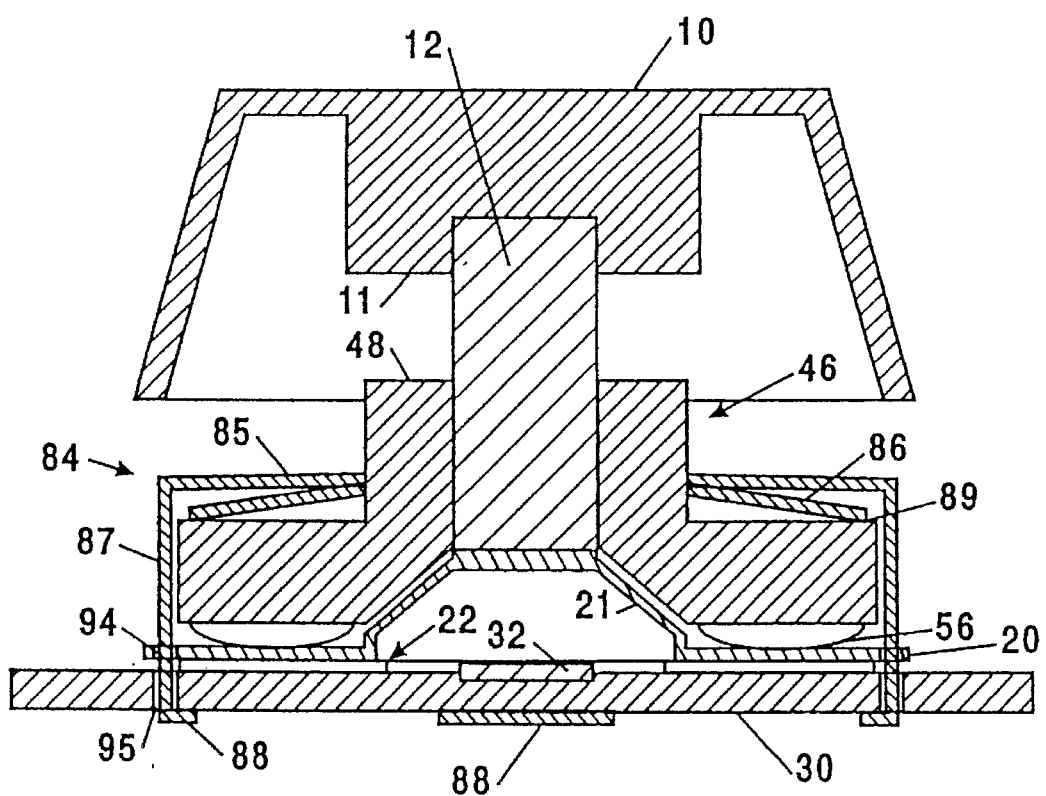
FIG. 10 is a cross-sectional view taken along line 10—10 in FIG. 9.

FIGS. 9 and 10 illustrate yet another embodiment of the present invention, again directed to applications that include elastomeric dome or membrane keyswitches as discussed above with respect to FIGS. 1–4. Referring to FIGS. 9 and 10, the base plate 30, sensor array 22, rubber dome sheet 20, guide/actuator 46, keycap 10 and plunger 12 are similar to those described above. Here, however, a pre-load spring assembly 84 is provided for pre-loading the four sensor elements. The pre-load spring assembly 84 is formed of a sturdy yet resilient material such as stainless steel 302 or PH 17-7. The pre-load spring assembly includes a frame portion 85 which is arranged to reside above an upper surface of the peripheral flange region of the actuator 46. The frame region 85 thus includes a central aperture 90, sized to clear the tower 47 of actuator 46. Frame portion 85 also includes four depending regions 87, arranged to extend in use alongside the actuator 46. Each of the depending members 87 is formed to include a respective retaining clip 88 adjacent a terminal end of the corresponding depending member. The pre-load spring assembly 84 also includes a pair of spring elements 86, each extending generally coplanar to the frame region 85. The terminal portions of each spring element 86 define a pair of ears 89, each ear extending downward below the plane defined by the frame region 85. The ears 89 contact the guide/actuator 46 at points 91.

The rubber dome sheet 20 includes four elongate slots 94 extending therethrough for receiving a respective one of the depending members 87. Similarly, the base plate 30 includes four elongate slots 95 also for receiving the depending members 87. The depending members are spaced apart sufficiently to avoid contacting the sensor array 22.

Referring now to FIG. 10, the mechanism is assembled so that the pre-load assembly 84 is disposed about the actuator 46 so that each of the ears 89 contacts an upper surface of the peripheral flange region of the actuator 46. Each of the depending members 87 extends down alongside the actuator 46 and through the corresponding slots 94 in the rubber dome sheet 20 and the slots 95 in base plate 30. The retaining clips 88 contact the lower surface of base plate 30 so as to retain the pre-load spring assembly 84 in position. The spring elements 86 exert downward pressure through the ears 89 on the actuator 46 to pre-load the force-sensing elements. The embodiment of FIGS. 9 and 10 is otherwise similar to the embodiments discussed above with respect to FIGS. 3 and 4. The pre-load spring assembly 84 has the advantage of providing both the pre-loading means and all necessary fasteners within a single integral unit. The spring assembly can be stamped out of a suitable metal and the necessary slots in the other elements can easily be stamped as well, resulting in simple and inexpensive manufacturing.

Figure 11:
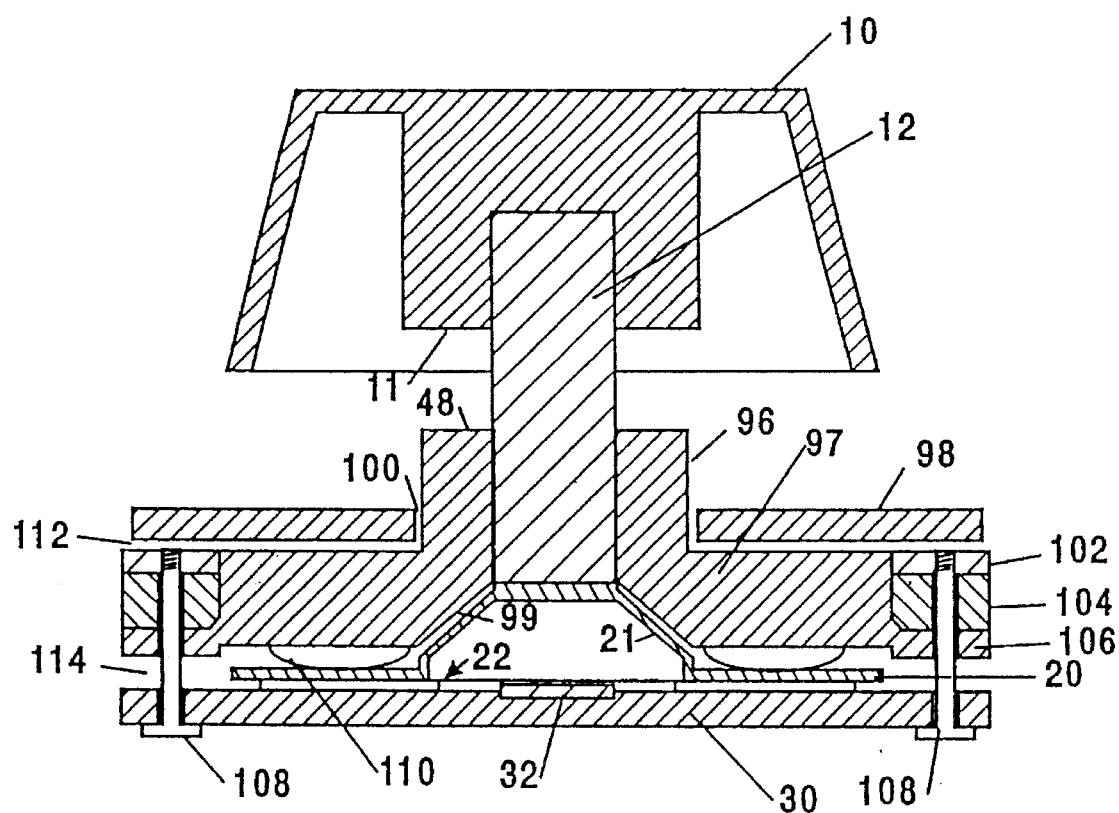
FIG. 11 is a cross-sectional view similar to FIGS. 2 and 4 showing the preload means located beside the switch mechanism instead of above or below it.

FIG. 11 illustrates yet another embodiment of the invention. While FIG. 4 illustrates a pre-load pad 44 disposed generally above an existing switch element, and FIG. 2 illustrates a pre-load pad 34 disposed below the existing switch element, FIG. 11 illustrates an embodiment in which pre-load pads 104 are disposed beside an existing switch element. Guide/Actuator 96 is substantially similar to those in FIGS. 2 and 4 with the addition of a preload flange 106 disposed just outside the region containing the curved actuator surfaces 110. Top surface 97 and preload plate 102 are separated from keyboard top plate 98 by a gap 112. Fasteners 108 retain the preload plate 102 to the base plate 30 while compressing pads 104 and flange 106 therebetween. A clearance gap 114 is provided so the actuator 96 can be rocked without binding. Gap 100 allows the actuator 96 to be displaced laterally without contacting top plate 98.

Figure 12:
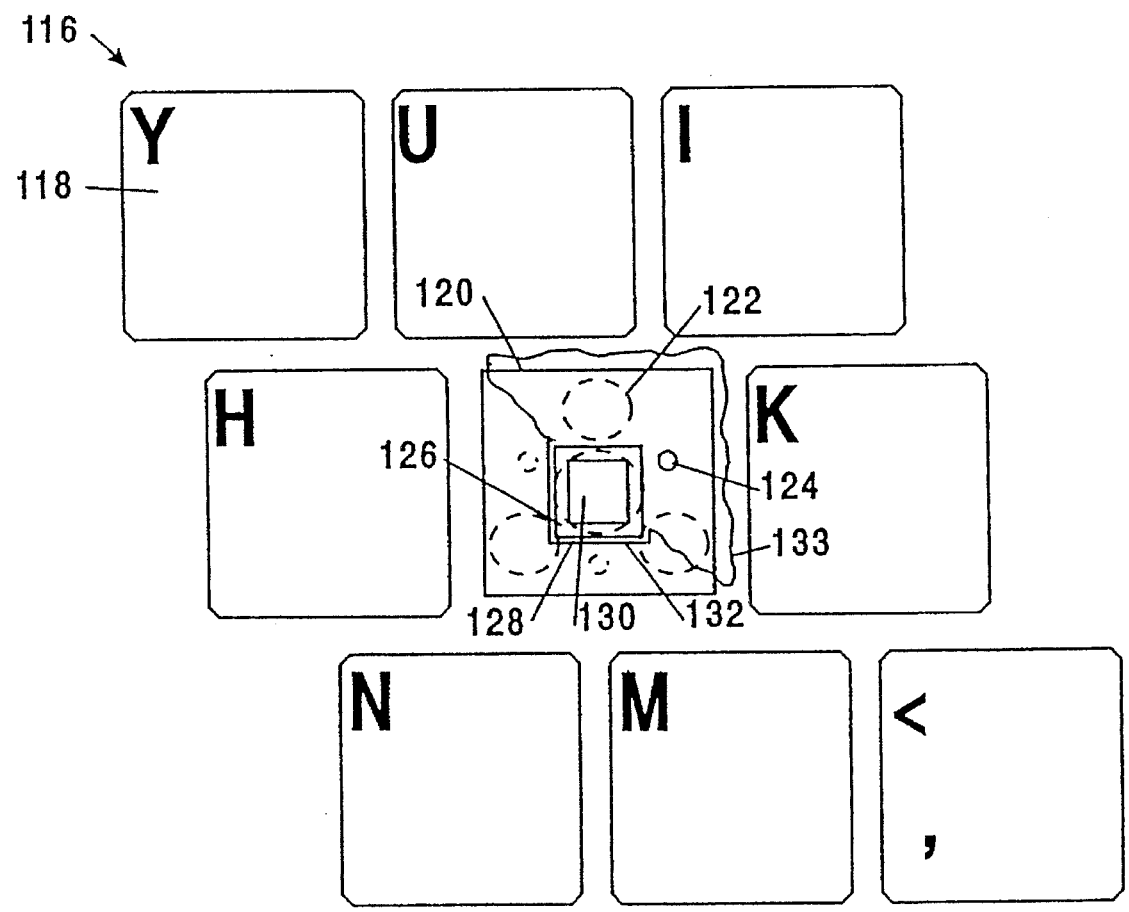
FIG. 12 is a partially broken-away top view a keyboard, with the J keycap removed, showing a mechanism similar to that of FIGS. 1 and 2 having three force sensing areas instead of four.

FIG. 12 is a partially broken-away plan view of a keyboard 116 having a plurality of keycaps, like keycaps 118. In arrangement, the system shown is similar to that in FIG. 1.

The keycap and plunger are removed from the "J" key in FIG. 12 to show important aspects of the present invention more clearly. Actuator/guide 120 is shown beneath top plate 133 through a cutaway view in the top plate.

Actuator/Guide 120 (hereinafter referred to as actuator 120) is similar to actuator 14 in FIG. 1 except that an alternative embodiment is shown using three force-sensing elements 122, denoted by dotted lines to indicate their location on the underside of the actuator 120, rather than four force-sensing elements, like elements 24 in FIG. 1. FIG. 12 shows the sensing elements 122 evenly spaced around a central aperture 130 of actuator 120. Furthermore, one of the sensing elements is preferably lined up with a major axis (in this case the Y axis), reducing the complexity of the computations required to derive XY signals from the sensor information.

A rubber dome 126 is shown indicated by a dotted line below an actuator indexing surface 132. The tower portion of actuator 120 is separated from the clearance hole 128 in top plate 133 by a working gap, as in the previous figures. Fastener attachment holes 124 are located midway between the sensing areas and allow fasteners to attach the actuator 120 to the preload means beneath the base plate (not shown) as in FIG. 1.

Figure 13:
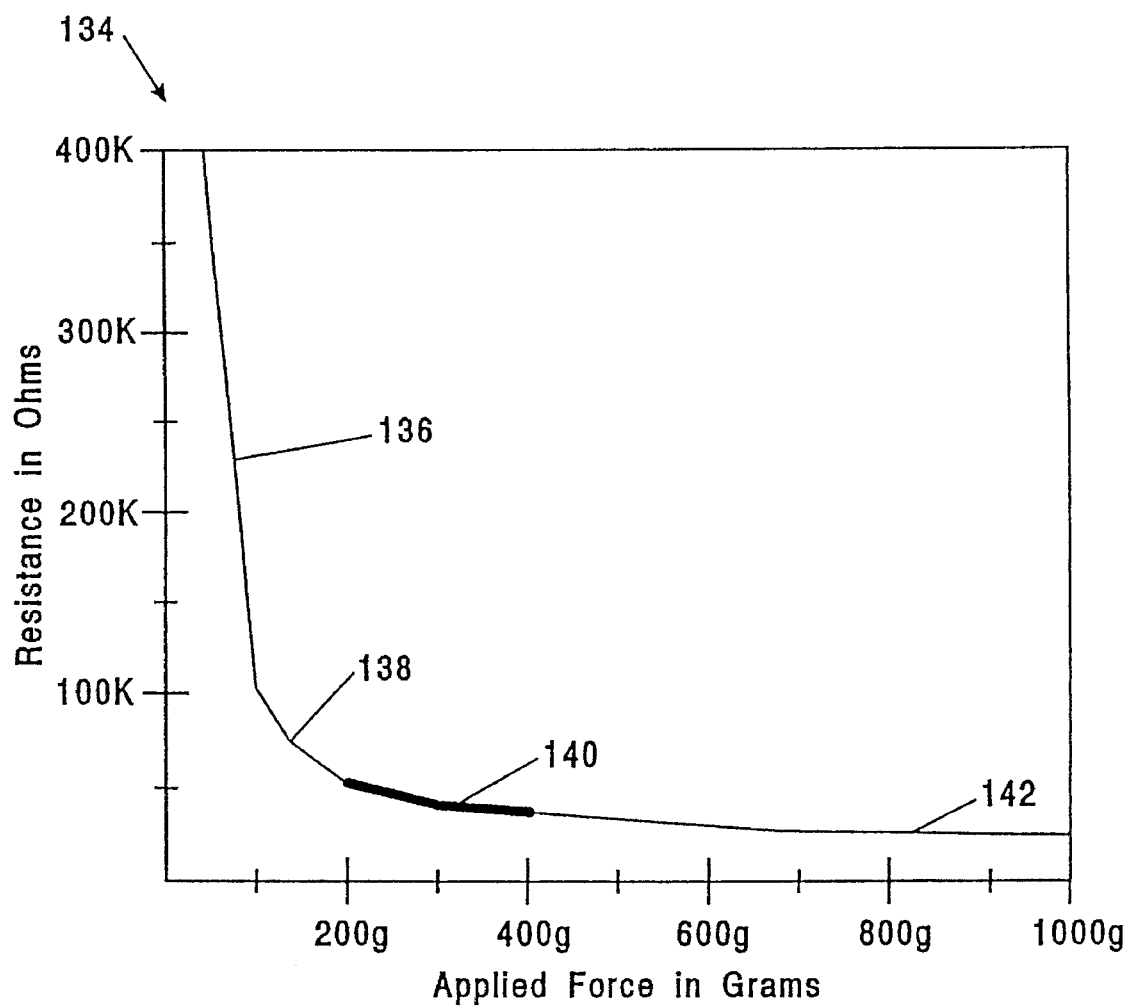
FIG. 13 is a plot of the force versus resistance plot for an FSR * force sensing resistor.

FIG. 13 is a graph of the response of the example FSR force sensing means. FSRs change resistance dependent upon the force.

Graph 134 shows this resistance versus force relationship. For forces below 50 grams or so the FSR array is essentially an open circuit. As the force is increased from 10 to 100 grams or so, the resistance drops suddenly as indicated by region 136. Region 136 is characterized by highly variable operation and is not useful for accurate or repeatable force sensing.

As the applied force is increased further, to 200 grams or so, the resistance changes stabilize as indicated by region 138. Region 140, denoted by the heavy line, represents the useful operating range of the FSR array, from approximately 200 to 450 grams.

One purpose of the preload means of the present invention is to provide a constant force of approximately 300 grams on each of the FSR sensing elements. This both moves the FSR operating point into a more linear, repeatable region and allows forces on the actuator to both increase (as an actuator bears down) or decrease (as an actuator lifts) forces on the FSR within it's useful range.

This latter effect of the preload means is very important, as it eliminates the need for a central pivot to distribute forces since the force sensors can now indicate reduced as well as increased loading. As forces are increased above 700 grams or so, the change in FSR resistance per additional gram lowers thus resulting in decreased sensitivity.

Having illustrated and described the principles of our invention in a preferred embodiment thereof, it should be readily apparent to those skilled in the art that the invention can be modified in arrangement and detail without departing from such principles. We claim all modifications coming within the spirit and scope of the accompanying claims.

We claim:

1. A pointing device for cursor control comprising:

an actuator assembly having an elongate plunger along a central vertical axis and having at one end a plurality of co-planar actuator surfaces arrayed initially in a horizontal plane;

a generally flat, rigid base located opposite the actuator surfaces;

generally planar force sensing means sandwiched between the base plate and the actuator surfaces, the force sensing means including at least three force sensing elements symmetrically disposed about the central vertical axis of the plunger and substantially registered with the actuator surfaces, each force sensing element responsive to a generally perpendicular force and each having a respective near-linear region of operation;

pre-load means including a compressed resiliently elastic member for urging the actuator assembly and the force sensing means together, thereby maintaining the actuator surfaces in constant contact with all of the force sensing elements to provide a common pre-load force on each force sensing element;

the pre-load means arranged to provide adequate compression so as to drive each of the force sensing elements into its respective near-linear region of operation;

fastener means connecting the actuator means and base plate together, said fastener means arranged to allow slight lateral movement of the actuator surfaces in a horizontal plane and corresponding tilting of the co-planar actuator surfaces from the initial horizontal position in response to a lateral external force imparted to the actuator assembly so as to impart an increasing force on at least one of the force sensing elements adjacent a downwardly tilting actuator surface and a decreasing force on at least one other of the force sensing elements adjacent an upwardly tilting actuator surface, thereby providing a differential signal to increase sensitivity of the pointing device.

2. A pointing device for cursor control according to claim 1 wherein the pointing device is disposed in a computer keyboard that includes a rubber dome sheet, and the device is arranged so that the rubber dome sheet extends between the actuator surfaces and the corresponding force sensing elements for disbursing forces applied through the actuator surfaces to the force sensing elements.

3. A pointing device for cursor control according to claim 1 further comprising a single, flat, rigid backup plate, disposed in parallel to and below the base plate;

and wherein the preload elastic member extends between the backup plate and the base plate.

4. A pointing device for cursor control according to claim 1 further comprising a fixed, rigid top plate, extending over the actuator assembly;

and wherein the preload elastic member extends between the top plate and the actuator assembly.

5. A computer keyboard for typing and cursor control having a plurality of keys for typing mounted on a reference plate, at least one key comprising:

a typing switch contact located on the reference plate and linked to a designated character;

a plurality of force sensing elements symmetrically disposed about and operated independent from the typing switch contact;

an actuator assembly including an elongate plunger moveable in a vertical direction and having a contacting end registered over and biased vertically away from the typing switch contact and a keycap engaged with the plunger and capable of transmitting to the plunger a downward vertical force imparted to the keycap by a user thereby contacting the plunger with the typing switch contact, the actuator further including protruding actuator surfaces each disposed in constant contact with a corresponding one of the force sensing elements under a common pre-load force and capable of asymmetrically transmitting a lateral force imparted to the keycap to the symmetrically disposed force sensing elements;

means for maintaining the common pre-load force applied to all of the force sensing elements so that the force sensors do not exhibit a null zone in operation;

and means responsive to a non-vertical external force applied to the actuator for effecting a decreasing resistance in at least one of the force sensors and an increasing resistance in at least one other of the force sensors, thereby providing a differential signal that increases sensitivity of the pointing device.

\* \* \* \* \*